United States Patent [19]

Chen et al.

[11] Patent Number: 4,729,925
[45] Date of Patent: Mar. 8, 1988

[54] POLYURETHANE ELASTOMERS COMPRISING A CHARGE-CONTROL AGENT AND SHAPED ELEMENTS THEREFROM

[75] Inventors: Tsang J. Chen, Rochester; Donald A. Upson, Webster; Paul D. Yacobucci, Rochester, all of N.Y.

[73] Assignee: Eastman Kodak Company, Rochester, N.Y.

[21] Appl. No.: 944,127

[22] Filed: Dec. 22, 1986

[51] Int. Cl.$^4$ .................................. C08G 18/30
[52] U.S. Cl. .................................. 428/425.8; 430/31; 430/902; 528/60; 528/64; 528/66; 528/71; 528/72
[58] Field of Search ............... 428/425; 430/31, 902; 528/60, 64, 66, 72, 71

[56] References Cited

U.S. PATENT DOCUMENTS

| | | | |
|---|---|---|---|
| 2,964,386 | 12/1960 | Evans et al. | 23/202 |
| 3,959,573 | 5/1976 | Eddy et al. | 428/425 |
| 3,959,574 | 5/1976 | Seanor et al. | 428/425 |
| 4,476,292 | 10/1984 | Ham et al. | 528/60 |

Primary Examiner—Maurice J. Welsh
Assistant Examiner—S. A. Acquah
Attorney, Agent, or Firm—John R. Everett

[57] ABSTRACT

Herein are disclosed polyurethane elastomers comprising a charge-control agent of the formula:

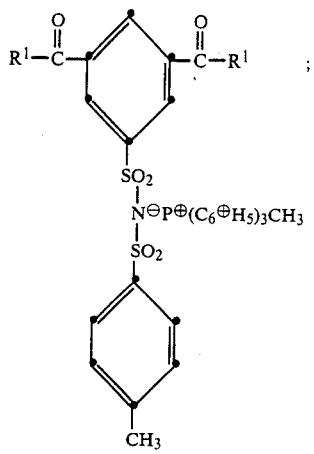

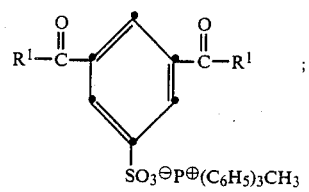

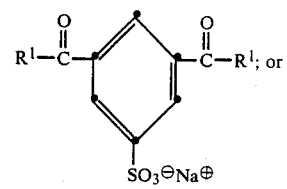

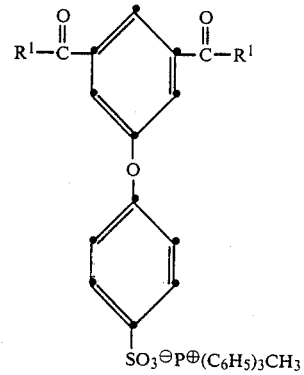

The elastomers are useful in making shaped articles.

7 Claims, 2 Drawing Figures

POLYURETHANE ELASTOMERS COMPRISING A CHARGE-CONTROL AGENT AND SHAPED ELEMENTS THEREFROM

FIELD OF THE INVENTION

This invention relates to charge-control agents, polyurethane elastomers comprising such charge-control agents and shaped elements made from such elastomers.

BACKGROUND OF THE INVENTION

Polyurethane elastomers are well known for use in making shaped articles of manufacture. Methods of making polyurethane elastomers are disclosed for example in U.S. Pat. No. 4,476,292 and U.S. Pat. No. 2,969,386. Such shaped articles of manufacture include tough wear-resistant parts, foundry patterns, core boxes, impact pads for railroad draft gears, dye pads for metal forming punch presses and a variety of shaped mechanical rubber-like components such as shock mitigation pads.

Another important group of shaped articles made from polyurethane elastomers includes electrically biasable parts for use in electrophotographic copying equipment, such as transfer rollers and transfer belts. Such transfer rollers and belts cooperate electrically with a photoconductive surface to establish a directional force field between the transfer roller or belt and the photoconductive surface. The direction of the force field assists in moving a toner-developed photoconductive image from the photoconductive surface to the transfer roller or belt. Subsequently the direction of the force field is reversed so that the image now residing on the transfer roller or belt can be transferred to a more permanent surface such as paper.

Transfer rollers, belts and other electrically biased shaped articles used in electrophotographic equipment are described in great detail in U.S. Pat. No. 3,959,573 and U.S. Pat. No. 3,959,574.

U.S. Pat. No. 3,959,574 describes transfer rollers and belts made from polyurethane elastomers wherein the polyurethane elastomer contains additives designed to establish a certain level of resistivity in the elastomers. The additives according to the patent must be soluble in or dispersible in the polyurethane elastomer. The additives are worked into the polyurethane by direct melting of the additive into the polyurethane or incorporating a solution or dispersion of the additive into the polyurethane. The problem is that over time the additives, for various reasons, are leached out of the elastomer. This results in a decline in the level of conductivity in polyurethane elastomers.

SUMMARY OF THE INVENTION

It is an objective of this invention to improve the ability of polyurethane elastomers to retain pre-established levels of resistivity.

That objective is achieved with a crosslinked polyurethane elastomer comprising from 0.04 to 0.01 mole percent of a copolymerized polyol charge-control agent having the formula:

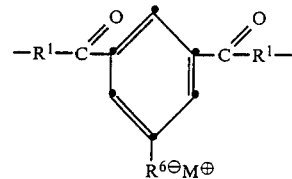

$R^1$ represents

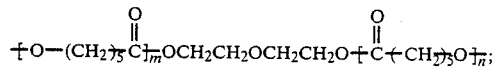

$R^6$ represents sulfonate, oxyphenylene sulfonate, oxycyclohexylene sulfonate or p-toluenesulfonamidosulfonyl;

m and n are integers which together are of sufficient value to achieve an $R^1$ molecular weight of 300 to 30,000;

M represents hydrogen, an alkali metal, ammonium or $P^+(C_6H_5)_3CH_3$.

In the polyurethane elastomer of the present invention the polyol charge-control agent is copolymerized with polyisocyanate prepolymers and other polyols normally used to make polyurethanes. Thus the charge-control agent is an integral part of the polymer and is not subject to being leached out as in the case of prior art polyurethane elastomers in which the charge-control agent is included as an additive.

In a preferred embodiment the polyurethane elastomers are formed from a two-part mixture. That two-part mixture comprises, in approximately stoichiometric amounts:

(a) a polyisocyanate prepolymer which is the reaction product of:
   (i) an aliphatic polyisocyanate, and
   (ii) an amine-based polyol; and
(b) a hardening mixture comprising:
   (i) a polyol selected from the group consisting of amine-based polyols, polyether polyols and mixtures thereof, and
   (ii) from 0.5 to 10 weight percent (preferably 1 to 6, and most preferably about 3 weight percent) of the hardener composition is comprised of the polyol charge-control agents described hereinbefore.

In another embodiment, the invention provides novel polyol charge-control agents having the structure:

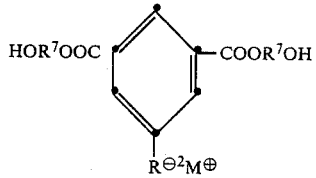

$R^2$ represents oxyphenylene sulfonate, oxycyclohexylene sulfonate, or p-toluenesulfonamidosulfonyl;

$R^3$ represents a straight or branched chain alkylene group having 2 to 7 carbon atoms;

$R^4$ is the same as $R^3$ or is $-(R^5-O)_x-R^5$;

$R^5$ is the same as $R^3$;

$R^7$ represents

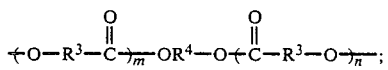

m and n are integers which together are of sufficient value to achieve an $R^7$ molecular weight of 300 to 30,000; and M represents hydrogen, an alkali metal, ammonium or $P^+(C_6H_5)_3CH_3$.

DETAILS OF THE INVENTION

Figure 1:
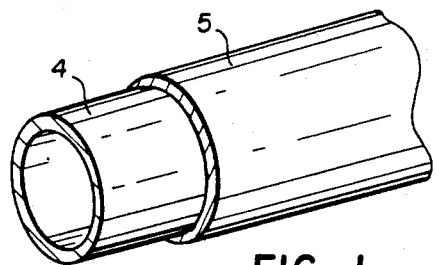
FIG. 1 is a schematic presentation of a conductive roller used in electrophotographic equipment.

The polyurethane elastomers are made using starting materials and methods which are well known for making polyurethane elastomers plus the polyol charge-control agents described herein. The charge-control agents contain an ionic group to impart conductivity to the elastomers.

The polyurethane elastomers are the chemical reaction products of (a) polyisocyanate prepolymers formed from an excess of an isocyanate (preferably an aliphatic or cycloaliphatic polyisocyanate compound) and (b) a hardener composition comprising a polyol (preferably an amine-based polyol) which is chain extended and/or crosslinked with one or more additional polyols, preferably an amine-based polyol, a polyether polyol, or mixtures thereof. About 1 to 8 weight percent (preferably 1 to 6, and most preferably about 3 weight percent) of the hardener composition is comprised of the polyol charge-control agents described hereinbefore.

Preferred polyol charge-control agents are:

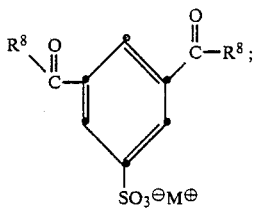

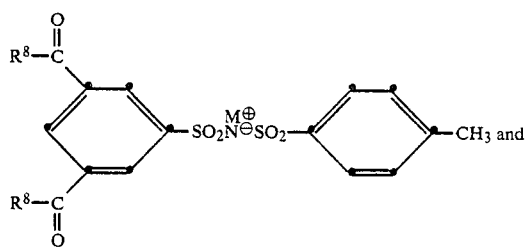

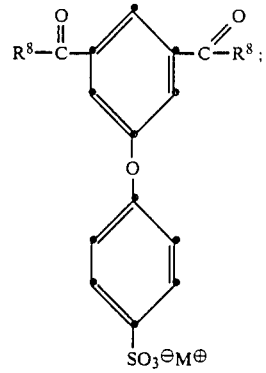

wherein $R^8$ is

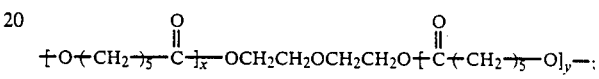

x and y are selected to provide a molecular weight for $-R-^8$ of about 530 and M is a cation such as potassium, sodium, methyltriphenylphosphonium, ammonium trimethylbenzylammonium, or the like.

The polyisocyanate prepolymer can comprise recurring units derived from other polyols, polyamines and mixtures thereof, and aromatic as well as aliphatic polyisocyanates. Exemplary polyisocyanate compounds which may be used to make the prepolymer are exemplified by those noted in U.S. Pat. Nos. 2,969,386 and 4,476,292 such as isophorone diisocyanate 4,4'-diphenylmethane diisocyanate; 1,5-napthalene diisocyanate; 3-isocyanatomethyl 3,5,5-trimethylcyclohexyl isocyanate (isophorone diisocyanate); 4,4'-methylene bis-(cyclohexylisocyanate); hexamethylene diisocyanate; biuret of hexamethylene diisocyanate; 1,3-cyclohexane bis(methylisocyanate); 2,2,4-trimethylhexamethylene diisocyanate, reduced methylene diphenyl diisocyanate and combinations thereof, as well as related aliphatic and cycloaliphatic polyisocyanates which may be substituted with other organic or inorganic groups that do not adversely affect the course of the polymerization reaction. The 4,4'-methylene bis(cyclohexylisocyanate), hexamethylene diisocyanate and isophorone diisocyanate are among the preferred.

The term "aliphatic", as used herein, includes those carbon chains which are substantially non-aromatic in nature. They may be saturated or unsaturated, unbranched, branched or cyclic in configuration and may contain various substituents. Such aliphatic isocyanates generally have an equivalent weight of from 60 to 160 and a viscosity of 1.0 to 1500.00 centipoises at 25° C. Exemplary of liquid long chain aliphatic polyisocyanates are dodecyl diisocyanate, tridecyl diisocyanate, and the like.

Polyols useful in preparing the prepolymers and finished polyurethane elastomers are exemplified by those disclosed in U.S. Pat. Nos. 2,969,386; 3,455,855; 4,476,292 and 4,390,679. One preferred group of polyols are aliphatic polyols and glycols such as glycerol, trimethylolpropane, 1,3-butylene glycol, propylene glycol, hydroxylated castor oils, hydroxyl-terminated polybutadienes, polyethers such as polybutylene ether glycols and polypropylene ether glycols and alkylenebis(polycaprolactones).

Another preferred group of polyols are amine-based polyols. The amine-based polyols employed to prepare the prepolymer and/or chain extend the prepolymer to the final conductive bulk polyurethane generally have an equivalent weight of from 30 to 6000 and a viscosity of from 1.0 to 20,000 centipoises at 25° C.-60° C. A wide variety of aromatic and aliphatic diamines may form part of the amine-based polyols. Such polyols include N,N,N',N'-tetrakis(2-hydroxypropyl)ethylenediamine and a polymer of ethylene diamine, propylene oxide and ethylene oxide. A typical aromatic amine-based polyol is available from Upjohn under the designation ISO-NOL 100; a typical aliphatic amine-based polyol is available from BASF under the designation QUADROL and a typical ethylene diamine/propylene oxide/ethylene oxide polymer is available from BASF under the designation PLURACOL 355.

Preferred concentration ranges for the respective components of the prepolymer are 85-90% by weight of polyisocyanate and 5-15% by weight polyol to form a resin prepolymer of 20-55% by weight polymer dissolved in 45-80%, by weight, of excess isocyanate; and preferably 30 to 40%, by weight, polymer in 60 to 70%, by weight, excess isocyanate.

The final conductive bulk polyurethane elastomer is produced by chain-extending and/or crosslinking the prepolymer with a hardener composition comprising additional amine-based polyols or polyether polyols and the charge control agents described hereinbefore.

The polyol hardener system comprises at least an amine-based polyol, a polyether polyol or blends of these polyols. The amine-based polyols have been identified hereinabove with N,N,N',N'-tetrakis(2-hydroxypropyl)ethylenediamine being preferred.

Suitable polyether polyols include aliphatic alkylene glycol polymers having an alkylene unit composed of at least two carbon atoms. These aliphatic alkylene glycol polymers are exemplified by polyoxypropylene glycol and polytetramethylene ether glycol. Di-, tri- and tetrafunctional compounds are available with the trifunctional ones being exemplified by the reaction product of glycerol or trimethylol propane and propylene oxide. A typical polyether polyol is available from Union Carbide under the designation PPG-425. Suitable polyether polyols will generally have molecular weights of from 60-7000 with the diols ranging from 60-200, the triols from 400-700 and the tetrols from 400-600.

The preferred polyol is a blend of aminebased polyol and polyether polyol in weight ratios ranging from 1:1 to 1:9 (preferably 1:2 to 1:4) having added thereto 0.5 to 10, preferably 1 to 6, most preferably about 4 weight percent of the total polymer of the ionic polyol charge control agent as described heretofore.

The polyurethane can also contain recurring units derived from amines including hindered amines (U.S. Pat. No. 4,390,679) incorporated in the prepolymer and/or in the hardener compositions. Exemplary amines are 4,4'-methylenebis(O-chloroaniline), phenylenediamine, bis(4-aminocyclohexyl)methane, isophoronyldiamine, and the reaction products of anhydrides and imides with such amines as described in U.S. Pat. No. 4,390,679.

The polyurethanes of this invention are prepared by admixing the prepolymer with the polyol hardener. Catalysts and optional additives are included within the hardener. Generally stoichiometric amounts of prepolymer and polyol are utilized, with the possibility of deviating from the stoichiometric amount by utilizing up to about 25% excess prepolymer or up to about 2% excess polyol. Solid, thermoset polyurethane elastomers are obtained within about 40 minutes at room temperature.

Catalysts are known to those skilled in the art and may comprise, for example, heavy metals utilized in amounts of about 0.1% metal, by weight of hardener, e.g. organo tin, organo zinc, mercury and lead compounds. Tertiary amines may also be utilized.

Optional additives include anti-foaming agents such as glycerine, an ethyl acrylate-2-ethylhexyl acrylate copolymer, dimethyl siloxane copolymers and silicones; antioxidants such as esters of $\beta$-(3,5-di-tert.butyl-4-hydroxyphenyl)-propionic acid with monohydric or polyhydric alcohols, for example, methanol, octadecanol, 1,6-hexanediol, neopentylglycol, thiodiethyleneglycol, diethyleneglycol, triethyleneglycol, pentaerythritol, tris-hydroxyethyl isocyanurate, and di-hydroxyethyl oxalic acid diamide; UV absorbers and light stabilizers such as 2-(2'-hydroxyphenyl)benzotriazoles and sterically hindered amines as bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid bis-(1,2,2,6,6-pentamethylpiperidyl)-ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylendiamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid and 1,1'(1,2-ethanediyl)-bis-(3,3,5,5-tetramethyl-piperazinone); plasticizers such as phthalates, adipates, glutarates, epoxidized vegetable oils, and the like; fungicides, pigments; dyes; reactive dyes; moisture scavengers; and the like.

The prepolymer-hardener mixtures of this invention, prior to curing, exhibit sufficiently low viscosities to facilitate mixing, pouring and air bubble diffusion, thereby allowing for the formation of bubble free castings of both simple and intricate shapes. The resulting molded conductive products exhibit low shrinkage during molding and subsequent thereto.

Commercially available polyurethane systems in which the polyol charge-control agents can be incorporated include 2-component polyurethane commercial mixes such as Conathane, TU-960 available from Conap, Olean, N.Y.; RP-6414 REN:C:O-THANE, polyurethane elastomer mix available from Ciba-Geigy Corp. and a system sold by Winfield Industries Inc., Buffalo, N.Y. under the trade name Winthane W111 or Winthane W121.

The following examples illustrate the preparation of the charge control agent and the subsequent preparation of polyurethane elastomers.

EXAMPLE 1

Preparation of 5-sodiosulfo-1,3-benzenedicarboxylate polyol

A 500 ml flask equipped with a stirrer, a nitrogen purge and a condenser was charged with 106 g of NIAX ® PCP-0200 (MW 530, supplied by Union Carbide) and 29.6 g of dimethyl 5-sodiosulfo-1,3-benzenedicarboxylate (DSB). Niax ® PCP-0200 is a poly(caprolactone)diol. A fine stream of nitrogen was passed through the flask. The content thereof was heated to about 250° C. with moderate stirring. Ti(C$_4$H$_9$O)$_4$, (0.05 ml) was then added. The temperature was kept at about 220° to 250° C. A clear melt was obtained after about 50 minutes of heating. The heating was continued for an additional 60 minutes. The contents were cooled to ambient temperature. A clear semi-solid was obtained which could be reheated (to about 60° C.) to pour, or dissolve in tetrahydrofuran (THF). A single glass transition temperature (−75° C.) and a relatively narrow GPC peak corresponding to a polystrene equivalent molecular weight of 1,650 were determined. The mole ratio of diol (PCP-0200) to DSB was 2.0.

EXAMPLES 2–8

Additional polyol charge-control agents were prepared following procedures similar to those described in Example 1. Results are shown in Table I. All showed single and relatively narrow molecular weight distribution using THF as the solvent.

TABLE I

| | Polyol Charge Control Agent | |
|---|---|---|
| Example | Composition, Mole Ratio | Appearance |
| 2 | (PCP0210/DSB) (2/1) | clear, viscous liquid |
| 3 | (PCP-230/DSB) (2/1) | opaque, waxy solid |
| 4 | (PCP0240/DSB) (2/1) | opaque, waxy solid |
| 5 | (PCP0210/SB) (2/1) | clear, viscous liquid |
| 6 | (PCP0230/SB) (2/1) | opaque, waxy solid |
| 7 | (PCP0210/DSB) (1.1/1) | clear, waxy solid |
| 8 | (PCP0210/DSB) (2/1) | clear, viscous liquid |

PCP is polycaprolactone having molecular weights of 830 (0210); 1250 (0230); 2000 (240).
DSB is dimethyl 5-sodiosulfo-1,3-benzenedicarboxylate.
SB is 5-(4-sodiosulfophenoxy)-1,3-benzedicarboxylate.

The following examples demonstrate the preparation of diol intermediates, conductive polyurethane elastomers and shaped articles derived therefrom; and the conductivity characteristics of the bulk polyurethanes.

EXAMPLE 9

Preparation of Bis[oxydiethylenebis(polycaprolactone)yl]5-Sodiosulfo-1,3-benzenedicarboxylate Polyol Charge-control Agent

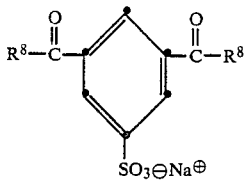

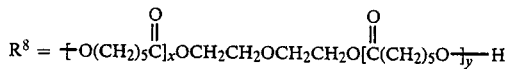

wherein x and y are selected to provide a molecular weight for R of about 530.

Dimethyl sodiosulfoisophthalate 27.9 g (0.094 mole) was added to 100 g (0.188 mole) of polycaprolactone, and 2 drops of the catalyst, tetraisopropyl-ortho-titanate. Under an $N_2$ sweep with stirring, the reaction mixture was heated to 220° C. for ½ hour at which time a clear melt was obtained. The temperature was increased to 250° C. and the reaction mixture was allowed to react at that temperature for one hour. The resultant material was cooled to 60° C., and transferred to a wide mouth glass jar and sealed until use.

EXAMPLE 10

Preparation of Bis[oxydiethylenebis(polycaprolactone)yl]5-Sulfo-1,3-benzenedicarboxylate, Methyltriphenylphosphonium Salt Charge-control Agent

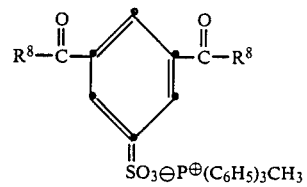

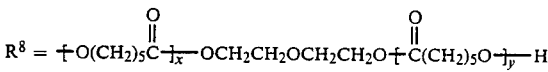

wherein x and y are selected to provide a molecular weight for the R group of about 530.

Step A

A one-liter, three-necked, round-bottom flask was charged 105.4 g (0.295 mole) methyltriphenylphosphonium Bromide, 87.6 g (0.295 mole) DSB and 500 ml distilled water. The solution was stirred and heated to 80° C. for 3 hours. Upon cooling to room temperature, an oily layer settled to the bottom of the reaction flask. The layer was separated and washed several times with distilled water. The water was decanted off and residual water was removed from the oil using a high vacuum pump. After drying under vacuum at 85° C., the material was isolated as a white solid; 93.26 g, 57.4% yield.

Step B

The sulfonate phosphonium salt from step A 40.22 g (0.073 mole) was added to 77.43 g (0.146 mole) of Polycaprolactone, and 2 drops of the catalyst, tetraisopropyl-ortho-titanate. Under an $N_2$ sweep with stirring, the reaction mixture was heated to 200° C. for ½ hour at which time a clear melt was obtained. The temperature was increased to 230° C. and the reaction mixture was allowed to react at that temperature for one hour. The resultant material was the titled diol. It was cooled to 60° C. and transferred to a wide-mouth glass jar, and sealed until use.

EXAMPLE 11

Preparation of 5-(p-Toluenesulfonamidosulfonyl)isophthalic, acid, Methyltriphenylphosphonium-Nitrogen Salt. Oxydiethylenebis(polycaprolactone)Ester Charge-control Agent

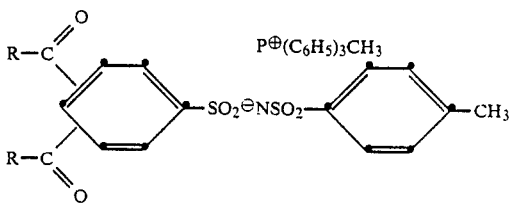

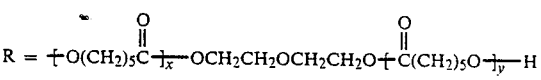

wherein x and y are selected to provide a molecular weight for R of about 530.

A one-liter, three-necked, round-bottom flask was charged with 100.0 g (0.22 mole) Dimethyl 5-(N-potassio-p-toluenesulfonamido)Sulfonylisophthalate, 79.3 g (0.22 mole) Methyltriphenylphosphonium Bromide, and 500 mL distilled water. The solution was stirred and heated to 80° C. for 4 hours. Upon cooling to room temperature, the product precipitated to the bottom of the reaction flask. The precipitate was filtered and washed several times with cold distilled water and dried under vacuum at 80° C. for 24 hours to yield 126.45 g of product as a white solid, 80% yield. The white solid was dimethyl 5-(N-phophonium-p-toluenesulfonamido)sulfonyl isophthalate.

The Dimethyl 5-(N-phosphonium-p-toluenesulfonamido)Sulfonyl-Isophthalate 124.45 g (0.18 mole) was added to 190.8 g (0.360 mole) of polycaprolactone, and 2 drops of the catalyst, tetraisopropyl-ortho-titanate. Under an $N_2$ sweep with stirring, the reaction mixture is heated to 200° C. for ½ hour at which time a clear melt is obtained. The temperature is increased to 230° C. and the mixture is allowed to react at that temperature for 2 hours. The resultant material was titled compound. It was cooled to 60° C. and transferred to a wide-mouth glass jar and sealed until use.

The polyurethane elastomers are capable of being made into shaped articles such as transfer rollers and belts in which the resistivity can be maintained between $1 \times 10^9$ and $1 \times 10^{11}$ ohm-cm. Such shaped articles exhibit toughness, high elongation, high tensile strength and high tear strength and excellent abrasion resistance. The shaped articles can be designed to have a hardness ranging from 40 Shore 00 to about 90 Shore AA. For use in making electrically biasable transfer rollers and belts, a Shore hardness of about 40–90 Shore A Durometers is preferred.

FIG. 1 shows a cut-away view of an electrically biasable transfer roller. The roller is basically formed upon a rigid hollow cylinder 4 that is fabricated of a conductive metal, such as aluminum, copper or the like, capable of readily responding to a biasing potential placed thereon. Over core 4 is placed a coating 5 which is a polyurethane elastomer of this invention. Coating 5 is preferably about 0.25 inch thickness. A coating of the polyurethane elastomer can be applied to the substrate by any suitable method or technique known in the art, including spraying or casting in molds.

Method of Making Transfer Rollers

Transfer rollers can be made from any one of a number of commercially available polyurethane two-component mixes to which a polyol charge-control agent is added. Examples include TU-960 to which is added the polyol charge-control agent at between 1 and 6% by weight of the total polyurethane. This results in a roller resistivity between $1 \times 10^9$ and $1 \times 10^{10}$ ohm-cm. In general, the polyurethanes used are of the two-component type comprising A and B. Part A is the isocyanate prepolymer. Part B is the hardener. The charge-control agent replaces a mole percentage of Part B. The preparation shown below is typical for a roller requiring approximately one liter of polyurethane and 4% charge-control agent to make a roller with a resistivity of $2.5 \times 10^9$ ohm-cm.

EXAMPLE 12

A modified 3 liter reactor is used as the mixing vessel. The ingredients are weighed out directly into the vessel as rapidly as possible. In the case of TU-960, 700 grams of Part A is mixed with 308 grams of Part B and 42 grams of the polyol charge-control agent. Part A is an isocyanate prepolymer. Part B is a polyol. Mixing is accomplished under vacuum to degas the mixture. After mixing the degassing, the vacuum is removed and the vessel is pressurized to approximately 5 psi (34.475 kPa) with dry nitrogen. A stopcock at the bottom of the vessel is opened and the polyurethane is forced out the bottom and into a prepared mold through standard flexible plastic hose. The mold is prepared by throughly cleaning the mold, treating all areas exposed to the polyurethane with mold release, and preheating the mold to 80° C. After filling the mold, the polyurethane is cured for 16 hours at 80° C. for 4 hours and conditioned for 48 to 96 hours at 100° F. and 50% RH. The roller is then ready for use.

The above procedures are useful for different polyurethanes. Only the mixing ratios and possibly the curing cycle are altered.

The dimensions of the conductive roller are dictated by the design of the copy equipment into which the rollers or belts are to be incorporated.

EXAMPLE 13

Preparation of a 50 Durometer Shore A Hardness Polyurethane Antistatic Roller

A solution of 100 g CANATHANE TU-500 Part A, 66.1 g CONATHANE TU-500 Part B, and 6.9 g of charge-control agent of Example 1 was mixed at room temperature for 9 minutes. CONATHANE Tu-500 Part A is an isocyanate terminated prepolymer. CONATHANE Tu-500 Part B is a polyol. The solution was degassed under vacuum for 2 minutes after the collapse of the head. A preparation in the shape of a cylindrical roller mold was filled with the mixture and cured in an oven for 16 hours at 100° C. The mold and casting were cooled to room temperature after which the casting was removed and deflashed if necessary. This polymer is referred to in the following figures as DSB DIOL.

EXAMPLES 14 and 15

Preparation of Conductive Polyurethane Elastomers

Elastomers were prepared by the procedure of Example 13, except using the methyltriphenylphophonium charge control agents of examples 10 and 11. All overall component weights remain as they were in Example 4.

Figure 2:
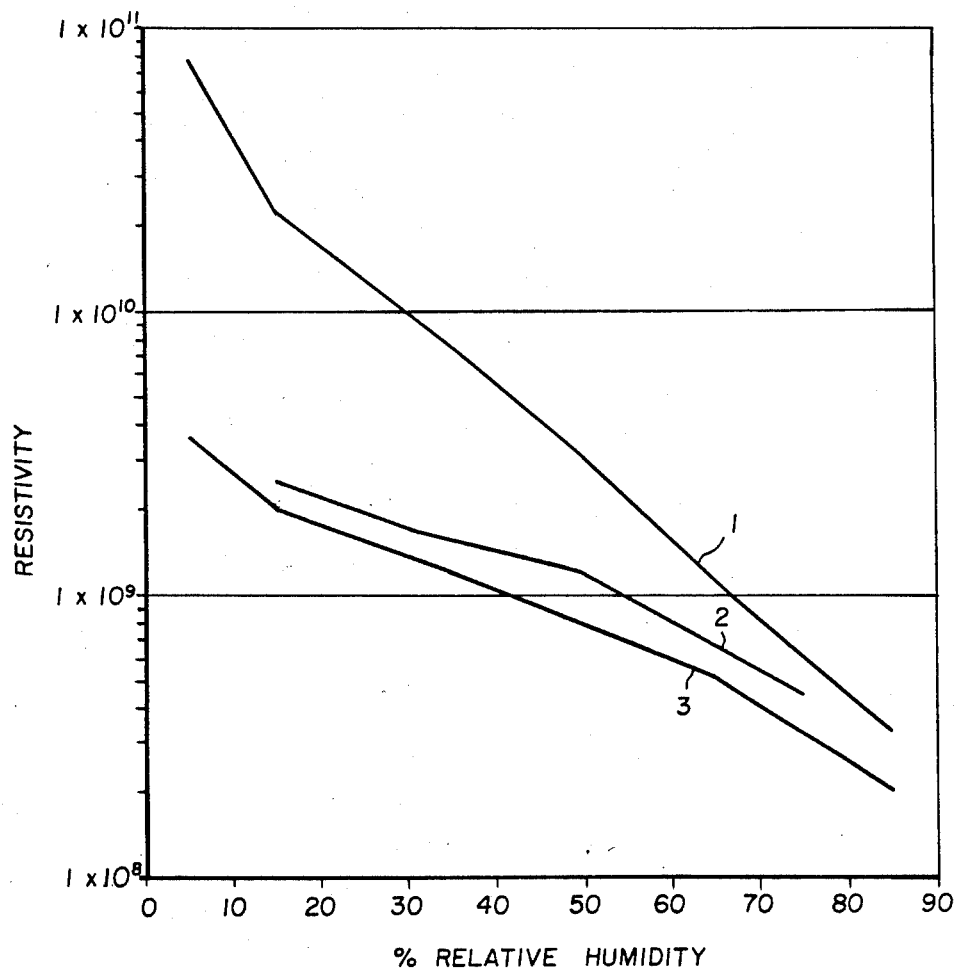
FIG. 2 is a graphic presentation of the resistivities of the polyurethane from examples 13, 14, and 15.

Electrical properties, i.e., resistivity of the polyurethane elastomers, are given in FIG. 2. The charge control agent and the related curve in the figures are as follows:

| Example | Charge Control Agent | Curve Number |
| --- | --- | --- |
| 13 | Example 1 | 1 |
| 14 | Example 11 | 3 |
| 15 | Example 10 | 2 |

In FIG. 2, curves 1, 3 and 2 represent the elastomers prepared in examples 13, 14 and 15 respectively. These curves show that a resistivity of below $10^{11}$ ohm-cm is achieved at very low humidities. The low resistivities of the elastomers of examples 14 and 15 are especially good.

The invention has been described in detail with particular reference to preferred embodiments thereof, but it will be understood that variations and modifications can be effected within the spirit and scope of the invention.

We claim:

1. A polyurethane elastomer formed from a composition comprising in approximately stoichiometric amounts:
   (a) a polyisocyanate prepolymer which is the reaction product of:
      (i) an aliphatic polyisocyanate, and
      (ii) an amine-based polyol; and
   (b) a hardening mixture comprising:
      (i) a polyol selected from the group consisting of amine-based polyols, polyether polyols and mixtures thereof, and
      (ii) from 1 to 8 weight percent based on the total weight of (b) of a charge-control agent having the formula:

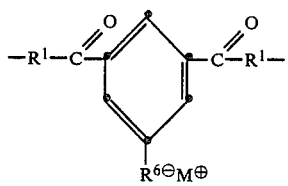

$R^1$ represents

$R^6$ represents sulfonate, oxyphenylene sulfonate, oxycyclohexylene sulfonate or p-toluenesulfonamidosulfonyl;

m and n are integers which together are of sufficient value to achieve an $R^1$ molecular weight of 300 to 30,000;

M represents hydrogen, an alkali metal, ammonium or $P^+(C_6H_5)_3CH_3$.

2. The elastomer of claim 1 wherein (a) the polyisocyanate in the prepolymer is 4,4'-methylene bis(cyclohexylisocyanate), hexamethylene diisocyanate or isophorone diisocyanate and (b) the amine-based polyol is N,N-bis(2-hydroxypropyl)aniline, N,N,N',N'-tetrakis(2-hydroxypropyl)ethylenediamine or a polymer of ethylene diamine-propylene oxide-ethylene oxide.

3. The elastomer of claim 1 wherein the charge-control agent is present (a) in amount of 1 to 6 weight percent of (b) and has the structure

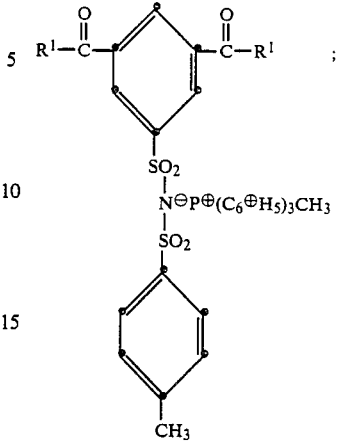

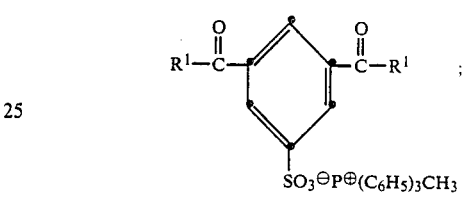

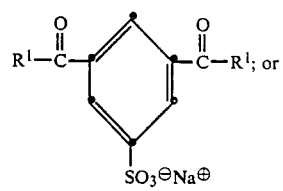

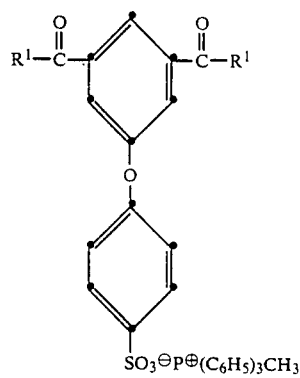

4. A crosslinked polyurethane elastomer comprising from 0.004 to 0.01 mole percent of a copolymerized polyol charge-control agent having the formula:

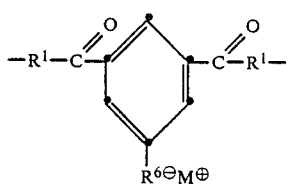

$R^1$ represents

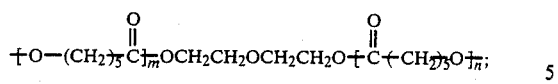

$R^6$ represents sulfonate, oxypheylene sulfonate, oxycyclohexylene sulfonate or p-toluenesulfonamidosulfonyl;

m and n are integers which together are of sufficient value to achieve an $R^1$ molcular weight of 300 to 30,000; and M represents hydrogen, an alkali metal, ammonium or $P^+(C_6H_5)_3CH_3$.

5. The polyurethane elastomers of claim 4 comprising a charge-control agent of the formula:

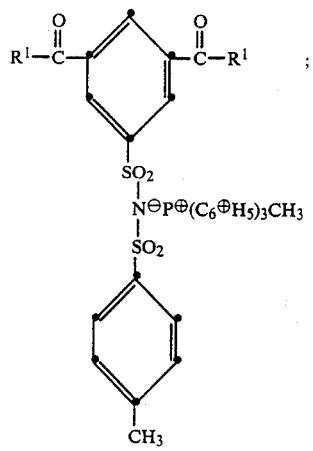

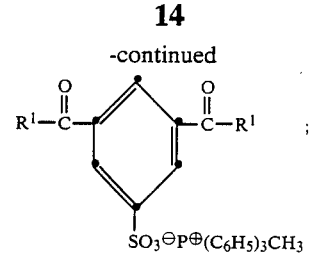

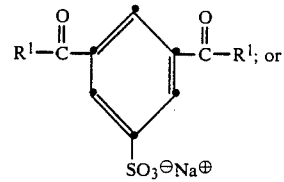

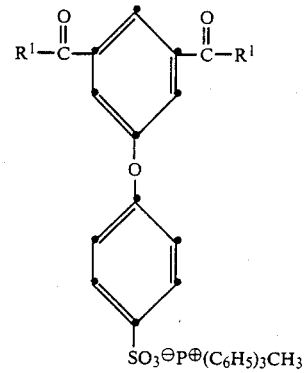

6. A shaped article comprising a polyurethane elastomer of claim 1, 2, 3, 4 or 5.

7. A shaped article comprising:
(a) an electrically conducting cylindrical core covered with a layer
(b) of a polyurethane elastomer according to claim 1, 2, 3, 4 or 5.

* * * * *